(12) United States Patent
Nagel

(10) Patent No.: US 7,257,995 B1
(45) Date of Patent: Aug. 21, 2007

(54) METHOD FOR TESTING NOZZLES OF INTERNAL-COMBUSTION ENGINES

(75) Inventor: Michael Nagel, Berne (DE)

(73) Assignee: Johann A. Krause Maschinenfabrik (DE)

(*) Notice: Subject to any disclaimer, the term of this patent is extended or adjusted under 35 U.S.C. 154(b) by 0 days.

(21) Appl. No.: 11/350,447

(22) Filed: Feb. 9, 2006

(51) Int. Cl.
*G01M 15/00* (2006.01)

(52) U.S. Cl. .................................... 73/119 R

(58) Field of Classification Search ............... 73/116, 73/117.2, 117.3, 118.1, 119 A, 119 R
See application file for complete search history.

(56) References Cited

U.S. PATENT DOCUMENTS 5,753,806 A    5/1998  Ryan, III et al.
6,053,037 A *  4/2000  Kojima et al. ............ 73/119 A

FOREIGN PATENT DOCUMENTS

| DE | 25 32 132 A1 | 2/1977 |
|----|----|----|
| DE | 201 176 A | 7/1983 |
| DE | 197 46 045 C1 | 10/1997 |
| JP | 02130260 | 5/1990 |
| JP | 07174668 A | 7/1995 |

OTHER PUBLICATIONS

EP Search Report No. EP 05 01 2702 dated Aug. 19, 2005.
DE Search Report Re File No. 0 2004 043 141.8 dated Apr. 27, 2005.

* cited by examiner

*Primary Examiner*—Eric S. McCall
(74) *Attorney, Agent, or Firm*—Laurence P. Colton; Smith Gambrell & Russell, LLP

(57) ABSTRACT

A method according to the invention makes it possible to make a check of the correct installation and operation of piston cooling nozzles (10) in a cold text prior to the final assembly of the engine by applying compressed air to each piston cooling nozzle (10) and directing the jet of compressed air emitted by the piston cooling nozzle (10) to be checked toward a surface pressure sensor (24). This makes it possible to record the position of the compressed air jet generated by the piston cooling nozzle (10) and preferably also the geometry of the jet. It is thereupon possible to draw conclusions concerning the proper operation and installation of the respectively checked piston cooling nozzle (10).

23 Claims, 3 Drawing Sheets

METHOD FOR TESTING NOZZLES OF INTERNAL-COMBUSTION ENGINES

BACKGROUND OF THE INVENTION

1. Technical Field

The invention relates to a method for checking nozzles of internal-combustion engines, with the nozzles being installed and in particular checked for their correct installation and/or operation prior to the complete assembly of the respective internal-combustion engine.

2. Prior Art.

Internal-combustion engines are usually equipped with fuel injection nozzles. In addition, more modern internal-combustion engines, in particular high-performance engines, have piston cooling nozzles, which spray oil against the bottom end of the piston, in particular in cooling ducts or supply ducts emanating from the bottom end of the pistons. These types of nozzles must not only generate a jet having a certain geometry, in particular a certain cross-section, but more importantly the jet must also follow a precisely determined direction in order that the oil of the piston cooling nozzles reaches the respective cooling duct or supply duct at the lower end of each piston. Consequently, the checking of injection nozzles as well as piston cooling nozzles must primarily be capable of determining jet geometry and jet direction.

Known prior to the invention has been the checking of nozzles, in particular injection nozzles, after they have been installed in the cylinder head but before the cylinder head has been mounted on the engine block. Here only the function of the injection nozzles is checked by an operating test, which merely shows whether or not the injection nozzle is in order. However, the jet geometry and particularly the jet direction cannot be determined by this known test. The same holds true for piston cooling nozzles. Here it is particularly crucial to test their jet direction in order to ensure that the jet of oil emitted from the piston cooling nozzles in the assembled engine also reaches the correct position at the bottom side of the respective piston, in particular the piston cooling duct or supply duct.

BRIEF SUMMARY OF THE INVENTION

Proceeding from the above, the object of the invention is to provide a method by means of which nozzles of internal-combustion engines, in particular injection nozzles and piston cooling nozzles, can be checked simply and reliably at least with respect to their jet direction, and preferably also with respect to their jet geometry.

A method for achieving this object is A method for checking nozzles of internal-combustion engines, with the nozzles being installed and in particular checked for their correct installation and/or operation prior to the complete assembly of the respective internal-combustion engine, characterized in that each nozzle is checked with a jet of fluid medium directed toward at least one pressure sensor. Accordingly, each nozzle, in particular each injection nozzle or piston cooling nozzle, is checked with a jet of fluid medium which is directed toward at least one pressure sensor. The use of the at least one pressure sensor allows one to determine the direction of the liquid jet emitted by the nozzle because the at least one pressure sensor, due to its pre-specified positioning, generates a signal only when the respective pressure sensor is struck. If the pressure sensor is only partially struck by the jet of air emitted by the respective nozzle, it generates an attenuated signal, which also allows one to draw conclusions about a jet direction deviating from the pre-determined direction. The intensity of the pressure signal registered by the pressure sensor also allows one to draw conclusions about the nozzle's jet geometry.

Pursuant to a preferred further development of the method according to the invention, a surface pressure sensor is employed which can also be formed from a plurality of individual pressure sensors arranged in an array or grid-like pattern. Accordingly, any reference to a surface pressure sensor made in the following also includes a sensor comprising a plurality of pressure sensors arranged in an array or grid.

Each surface pressure sensor can determine, or more precisely scan, the pressure of the liquid jet emitted by the nozzle to be checked in the pre-specified surface region. The checking method according to the invention is even capable of establishing the position at which the tested jet emitted by the nozzle to be checked strikes the surface scanned by the surface pressure sensor (test surface). This enable one to make precise conclusions concerning the direction of the liquid or tested jet emitted by the nozzle to be checked. The jet geometry of the tested jet can be determined by the size and shape of the surface area on which the liquid jet emitted by the nozzle has generated a pressure signal on the surface pressure sensor. The pressure signal can be represented by the surface pressure sensor as a three-dimensional image, with the pressure value being spatially plotted on a reference line perpendicular to the test surface. Thus, a pressure distribution pattern of the tested jet can be determined over the cross-sectional area of the test surface, namely the plane occupied by the surface pressure sensor.

The invention also provides that pressure sensors, in particular surface pressure sensors, can determine a pressure across the preferably entire surface area of a respective cylinder bore (when checking a piston cooling nozzle) in the engine block or, (when checking an injection nozzle) of a combustion chamber in the cylinder head. By virtue of this arrangement, a largest possible surface area is available for checking the jet direction and preferably also the jet geometry exhibited by the tested jet of the injection nozzle or piston cooling nozzle. It is possible to determine the pressure across practically the entire cross-sectional area of the cylinder bore in the engine block or of the combustion chamber in the region of the bearing surface of the cylinder head on the engine block. This makes it possible to make a check of the direction and geometry of the injection jet of injection nozzles and the cooling jet of piston cooling nozzles which has the greatest possible statistical significance.

According to a further embodiment of the invention, for the purpose of checking piston cooling nozzles, it is possible to attach the surface pressure sensor associated to each piston cooling nozzle or cylinder bore to the side of the engine block facing the cylinder head via the respective cylinder bore during the check of the piston cooling nozzles. Preferably, all piston cooling nozzles of the internal-combustion engine are tested simultaneously. Thus, for a six-cylinder internal-combustion engine having one piston cooling nozzle per cylinder, six surface pressure sensors would be temporarily attached through the respective cylinder bore. To simplify the checking process, it is possible to attach all or only a group of surface pressure sensors to a common carrier so that all or at least a plurality of surface pressure sensors can be attached simultaneously and in the correct position relative to the engine block in a single operation and also subsequently detached. The surface pressure sensors are impinged by the end of the tested jet, which extends through the entire cylinder bore, on the side of the engine block lying opposite the piston cooling nozzle.

The check of the injection nozzles provides for the assignment of each injection nozzle to a surface pressure sensor arranged on the side of the cylinder head bearing on the engine block. The surface pressure sensor is then situated at the front of the combustion chamber, specifically at its greatest cross-section, because the surface of the combustion chamber has its greatest area at the side of the cylinder head which bears upon the engine block. For this purpose each injection nozzle or each cylinder is to be assigned its own surface pressure sensor. All or part of the surface pressure sensors can be assigned to a common carrier.

Pursuant to a preferred embodiment of the method, the respective surface pressure sensor covers either the entire opening of the combustion chamber at the bearing side of the cylinder head on the engine block or the entire cylinder bore in the engine block. As a result, the largest possible surface area of the cylinder bore or of the combustion chamber can be assessed by the respective surface pressure sensor concerning the impact and the cross-section of the tested jet which is emitted by the respective nozzle for testing of the latter.

Preferably, the injection nozzles or piston cooling nozzles are continually impinged with compressed air during the checking operation, with the surface pressure sensors determining at least the location and the pressure of the compressed air emitted by the nozzles, and preferably also the distribution of pressure across the cross-section of the compressed air jet. This ensures a significant checking of the piston cooling nozzles as well as of the injection nozzles with respect to their mode of operation, correct nozzle bore and above all the proper mounting of the piston cooling nozzles in the engine block or of the injection nozzles in the cylinder head. The compressed air allows for a contaminant-free cold test without falsifying the test or measured results in a non-reproducible manner.

During checking, a continuous jet of compressed air is generated by the piston cooling nozzles or injection nozzles, preferably throughout the entire checking procedure. This means that measurements can be taken continually over a certain period of time, thus ensuring significant, i.e. stable, measurements over a certain period of time due to the time recording of the measured results of the surface pressure sensors. If a constant measurement result cannot be shown within at least a certain period of time during the test, one can draw conclusions about errors in the measurement device. One can therefore see that a test result which might suggest improperly functioning nozzles or their incorrect installation cannot be evaluated because the testing device and/or a measuring calculation for evaluating the results of checking are faulty.

Pursuant to a preferred embodiment of the method, compressed air kept at room temperature is used to check the piston cooling nozzles as well as the injection nozzles. Thus, the compressed air used for the check can be taken from the usually present supply of compressed air and does not require any additional treatment. The method according to the invention can therefore be successfully employed at a minimum additional cost to the user.

It is also intended to use air compressed at a pressure of 1 to 5 bar, preferably 2 to 3 bar, for checking the injection nozzles as well as the piston cooling nozzles. Air pressurized at such a level is also available in common compressed air networks and thus the method can be realized in this respect at a low cost. Due to the use of surface pressure sensors or an array or grid comprising a plurality of pressure sensors, air pressurized between 1 and 5 bar, in particular 2 to 3 bar, is sufficient for checking the piston cooling nozzles and injection nozzles in order to obtain significant results as measured by the employed pressure sensors, in particular surface pressure sensors. The pressure level of compressed air may lie at the lower limit of the aforementioned pressure range if the distance between the nozzle to be checked and the surface pressure sensor is relatively small, as is the case, for example, when checking injection nozzles in the cylinder head. If the distance between the piston cooling nozzles and the surface pressure sensor is greater, in particular in long-stroke internal-combustion engines, air compressed at a pressure in the upper region of the specified ranges can be used to check the piston cooling nozzles.

BRIEF DESCRIPTION OF THE DRAWINGS

Two preferred exemplary embodiments of the invention will be discussed in more detail in the following on the basis of the drawings, which show.

DETAILED DESCRIPTION OF THE PREFERRED EMBODIMENTS

Figure 1:
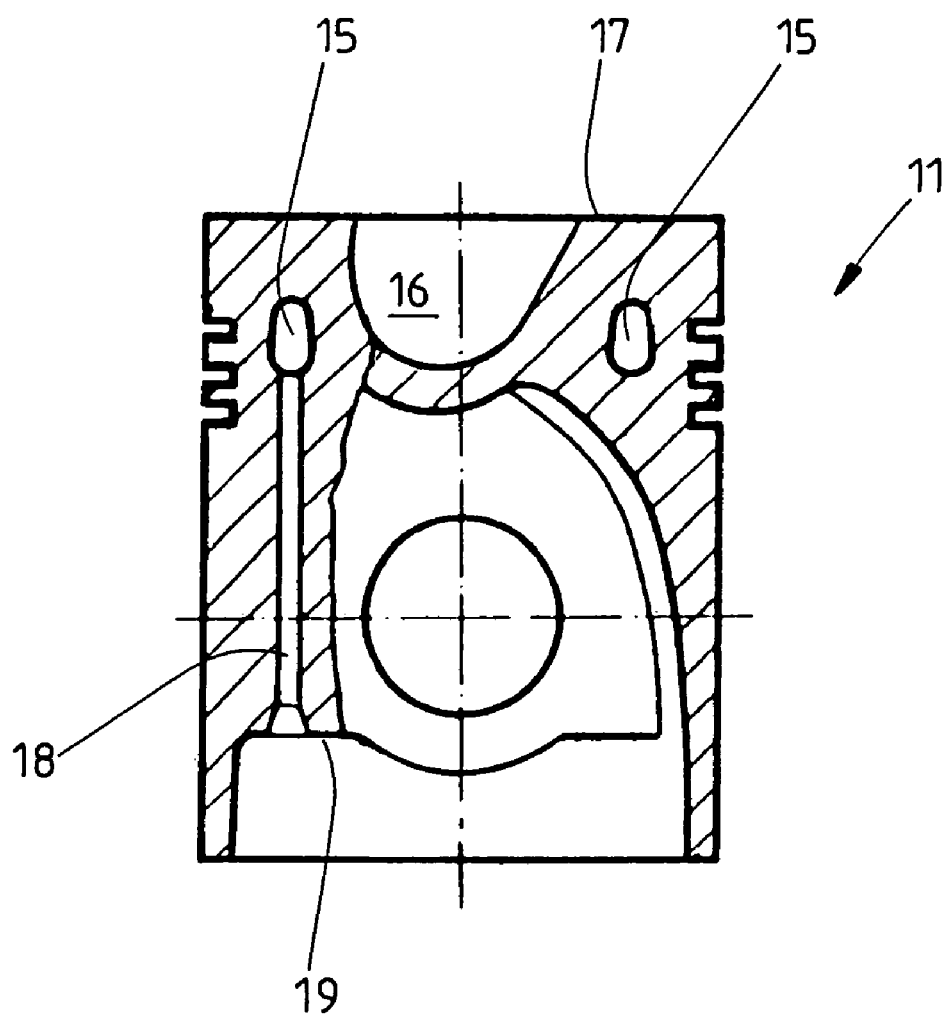
FIG. 1 is a schematic vertical section through a piston with a piston cooling duct.
Figure 2:
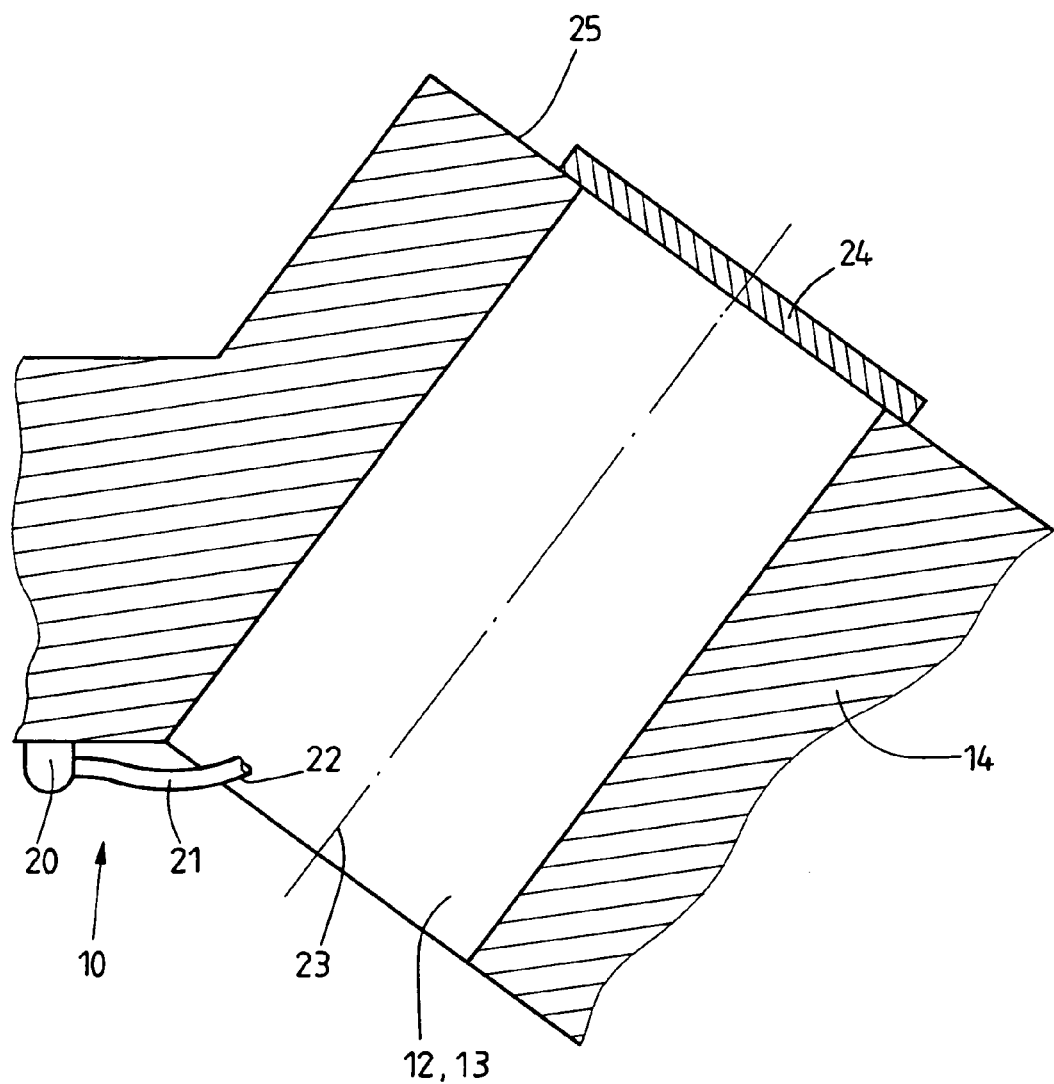
FIG. 2 is a schematic view of part of a cylinder head in the region of a cylinder bore with its associated piston cooling nozzle.

The method according to the invention for checking piston cooling nozzles 10 of internal-combustion engines will be illustrated in conjunction with FIGS. 1 and 2. Each cylinder 12 or each pair of adjacent cylinders of the internal-combustion engine is assigned a piston cooling nozzle 10. Thus, for a six-cylinder internal-combustion engine a total of six piston cooling nozzles 10 are present. These nozzles are checked simultaneously in the operating test prior to the complete assembly of the internal-combustion engine, particularly if the pistons 11 have not yet been installed in the cylinder bores 13 of the engine block 14.

FIG. 1 shows a longitudinal section through the piston 11. Inside the piston 11 is a preferably annular cooling duct 15. This is disposed in the upper region of the piston 11, namely encompassing a combustion chamber recess 16 which proceeds from the top side 17 of the piston 11 to form part of the combustion chamber. In place of the cooling duct 15, one can also provide cooling coils or more complex cooling spaces (in two-part pistons). The cooling duct 15 is provided with liquid coolant, in particular oil, through a usually vertical, straight supply duct 18. The supply duct 18 is open in the region of the bottom side 19 of the piston 11 and its upper end opens out at a point in the cooling duct 15 (FIG. 1).

The piston cooling nozzle 10 is attached at a bottom side of the engine block 14. The piston cooling nozzle 10 can be configured to have a center coolant feeder 20 which is supplied by the crankcase with oil from the oil pan. The piston cooling nozzle 10 with the coolant feeder 20 is then screwed on under the engine block 14. In the shown exemplary embodiment two opposite tube sections 21 branch off the coolant feeder 20 and lead to the bottom side of the adjacent cylinder 12. One piston cooling nozzle 10 then provides coolant, in particular oil, simultaneously but separately to two pistons 11 in different cylinder bores 13. Each tube section 21 of the piston cooling nozzle 10 is formed such that a nozzle-like cooling nozzle end 22 extends from below into the respective cylinder 12, specifically in such a manner that coolant is sprayed from the cooling nozzle end 22 parallel to the cylinder center axis 23 upwards in a vertical and eccentric direction under the pistons 11. This is carried out in such a manner that the coolant jet emitted from the cooling nozzle end 22 of the piston cooling nozzle 10 is directed exactly into the coolant supply duct 18 running parallel to the cylinder center axis 23 to the cooling duct 15. The piston cooling nozzle 10 must be mounted under the engine block 14 such that the cooling oil emitted from the cooling nozzle end 22 enters the supply duct 18 in the piston 11 from below. In addition, the oil jet must have a geometry, in particular a jet cross-section, which matches the diameter of the supply duct 18 in order that at least a large part of the coolant oil sprayed out of the cooling nozzle end 22 against the piston 11 from below reaches the supply duct 18. As an alternative, the piston cooling nozzle can also be configured such that its supplies cooling oil to a single piston 11 only. Then each piston 11 or cylinder is provided with its own piston cooling nozzle.

According to the method of the invention, a cold test is made to check the positioning and preferably also the geometry and cross-section of the coolant jet before the internal-combustion engine is assembled, in particular before the pistons 11 have been inserted in the engine block 14. During this test, all piston cooling nozzles 10 of the internal-combustion engine are simultaneously and continuously supplied with a pressurized fluid medium. The fluid is then emitted through each cooling nozzle end 22, and in the process passes through each cylinder bore 13 in the engine block 14 of the internal-combustion engine from the bottom to the top. The fluid medium used is preferably compressed air. The air pressure applied is 1 to 5 bar, preferably 2 to 3 bar. The air pressure itself is approximately 2 bar. Air having the ambient temperature is used. Thus, the air is neither cooled nor warmed with respect to the ambient temperature. Such compressed air can be taken from the normally present compressed air supply network.

According to a preferred embodiment of the invention, a surface pressure sensor checks the position of each tested air jet, in particular its geometry, and above all its cross-section. At least a qualitative, and preferably also a quantitative determination is made of the dominant pressure at every position of the surface pressure sensor. The surface pressure sensor can also be formed from a grid or array of many individual pressure sensors, which by virtue of their uniform grid-like distribution over a certain surface area can make an even scan of the measured pressure area thus formed. As a result, it is possible to determine the location at which the jet of test fluid, in particular the jet of compressed air, strikes the measuring surface of the surface pressure sensor or the grid of a plurality of identical pressure sensors. In addition, the surface pressure sensor can determine the cross-section of the test jet, in particular the test air jet, striking the measuring surface of the surface pressure sensor, thus making it possible to draw conclusions concerning the jet geometry of the test jet or test air jet.

Each of the surface pressure sensors 24, which are identical to each other, is dimensioned such that it completely covers the top surface area of a cylinder bore 13 of the engine block 14, preferably with a circular overlapping of the top side 25 of the engine block 14 facing the cylinder head 28. The surface pressure sensor 24 is thus located on the side of the cylinder bore 13 which is opposite the cooling nozzle end 22. By virtue of the complete covering of the top side of the cylinder bore 13 by the surface pressure sensor 24, the latter is capable of determining the pressure of the test air jet emitted upwards from the respective cooling nozzle end 22 in the entire region of the cylinder bore 13.

For the realization of the method according to the invention, each of the individual surface pressure sensors 24 assigned to a cylinder bore 13 can be detachably affixed above the respective cylinder bore 13 on the top side 25 of the engine block 14. Provided for this function is an attachment device (not shown in the figures) which is configured such that it can be easily attached to the top side 25 of the engine block 24 and detached from it just as easily. As an alternative, it is conceivable to design the attachment device such that it simultaneously locks all identically configured surface pressure sensors 24, which are to be associated with cylinder bores 13 arranged in a row in the engine block 14, on the top side 25 of the engine block 14 in a detachable manner. By means of this arrangement, it is possible for all surface pressure sensors 24 for a row of cylinder bores 13 in the engine block 14 to be fixed simultaneously in their proper position above the respective cylinder bore 13 in a single assembly work step. After testing, all surface pressure sensors 24 can be simultaneously detached in common from the top side 25 of the engine block 14.

The method according to the invention for the preferably simultaneous checking of all piston cooling nozzles 10 of an internal-combustion engine proceeds as follows in the cold test:

After all piston cooling nozzles 10 have been installed at the underside of the engine block 14, but no cylinder 12 has yet been placed in the cylinder bores 13 of the engine block 14, a surface pressure sensor 24 is attached on the top side 25 of the engine block 14 through each cylinder bore 13, covering the latter with its full surface. The surface pressure sensors 24 can be attached either in common or individually to the top side 25 of the engine block 14 for executing the checking operation. All surface pressure sensors 24 are permanently provided with test leads which are connected to a preferably single, common test computer. If necessary, these leads can also be used to supply energy to the surface pressure sensors 24. All cooling nozzles 10 are now impinged with a test fluid medium, in particular with compressed air. This is preferably accomplished by attaching the coolant feeder 20 of each piston cooling nozzle 10 to a compressed air supply.

After the compressed air has been released from the compressed air supply, the compressed air to be used for testing flows out of the cooling nozzle ends 22 of the piston cooling nozzles 10. If the piston cooling nozzles 10 are intact and correctly installed, a thin jet of compressed air flows out of the cooling nozzle ends 22 parallel to the cylinder center axis 23 in the direction of the surface pressure sensors 24 at the top side 25 of the engine block 14. The respective surface pressure sensor 24 now determines the position where the test air jet has struck the surface pressure sensor 24.

Besides determining the position where the respective jet of compressed air or test air has struck the surface pressure sensor 24, preferably at its underside, it is also possible to determine whether the test air jet has been properly mounted. One can also determine the pressure with which the test air jet strikes the surface pressure sensor 24. This can then be used to determine whether the piston cooling nozzle 10—in particular the cooling nozzle end 22 where the test compressed air escapes from the piston cooling nozzle 10—has been properly manufactured. It is also possible to determine the shape and size of the surface area struck by the test air jet on the surface pressure sensor 24 and thus establish its geometry.

Figure 3:
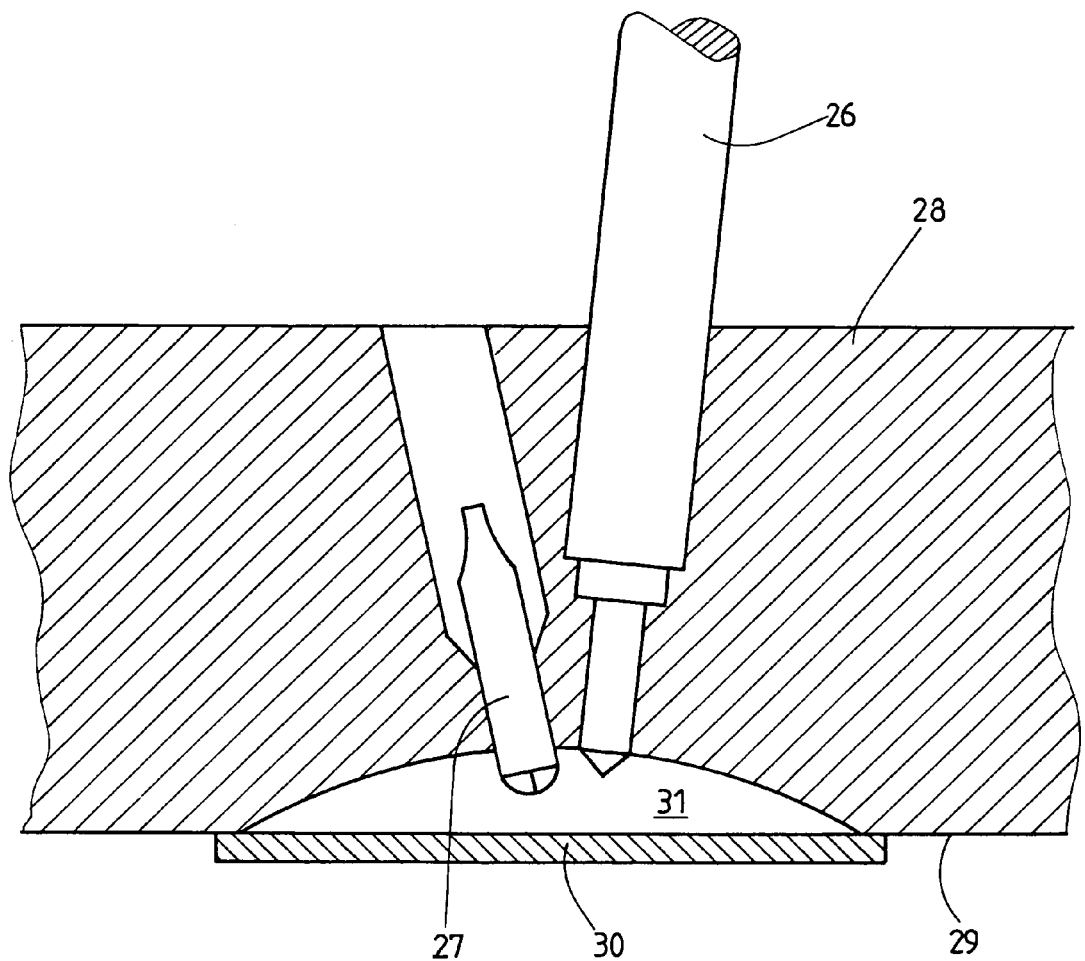
FIG. 3 is a schematic view of part of a cylinder head in the region of an injector nozzle.

FIG. 3 illustrates the use of the method according to the invention for checking injection nozzles 26 in a cold test. The check is made after all injection nozzles 26 and all spark plugs 27 have been installed in the cylinder head 28 of the internal-combustion engine. At the same time, however, the cylinder head 28 with the injection nozzles 26 and the spark plugs 27 has not yet been placed on the engine block 14. The bottom side 29 of the cylinder head 28 facing the top side 25 of the engine block 14 is therefore still freely accessible. Preferably the injection nozzles 26 have not yet been connected to fuel lines. Nor must the spark plugs 27 yet be connected to the circuit of the ignition system.

All injection nozzles 26 are checked simultaneously in an operating test. Accordingly, during the check the injection nozzles 26 are not supplied with fuel but instead with a fluid test medium, in particular compressed air at room temperature and having a pressure between 1 and 5 bar, preferably 2 to 3 bar. The compressed air can be taken from a usual source of compressed air.

Likewise employed for checking the injection nozzles 26 is a surface pressure sensor 30 arranged at the bottom side 29 of the cylinder head 28 in the region of each combustion chamber 31. The surface pressure sensor 30 can have the configuration and operation mode of the previously described surface pressure sensor 24. In this respect, reference will be made to the remarks describing the checking of piston cooling nozzles 10 in conjunction with FIGS. 1 and 2.

A surface pressure sensor 30 is arranged under each combustion chamber 31 located at the bottom side 29 of the cylinder head 28. The surface pressure sensor 30 is dimensioned such that it completely covers the respective combustion chamber 31, preferably with a circular overlapping of the marginal region of the bottom side 29 of the cylinder head 28 around the combustion chamber 31. The surface pressure sensors 30, which are preferably identical to one another, are also detachably affixed individually or in groups to the bottom side 29 of the cylinder head 28 by means of an attachment device (not shown). The checking of the injection nozzles 26 is in principle carried out in the same manner as the checking of the piston cooling nozzles 10.

The injection nozzles 26 mounted in the cylinder head 28 are checked in the cold test before the cylinder head 28 is joined with the engine block 14. To this end, each combustion chamber 31 is assigned its own surface pressure sensor 30, which is affixed at its bottom side 29 which is still open for access. Either all of the surface pressure sensors 30 (or groups comprising a plurality thereof) are arranged together, i.e. simultaneously, under the bottom side 29 of the cylinder head 28, or the surface pressure sensors 30 are individually attached at these positions in succession. In the process, each surface pressure sensor 30 covers a combustion chamber 31.

The injection nozzles 26 are checked simultaneously. To this end, each injection nozzle 26 is provided with a continuous, i.e. non-interrupted, supply of compressed air during the checking operation. The compressed air emitted from each injection nozzle 26 forms a test jet which strikes the surface pressure sensor 30 located opposite the respective injection nozzle 26. In the process, the surface pressure sensor 30 measures the compressed air or test jet emitted from the injection nozzle 26. On the basis of this measurement, the surface pressure sensor 30 can, on one hand, determine the position of impact of the test jet. On the other hand, it can also determine the pressure at which the test jet strikes the surface pressure sensor 30 as well as the form and dimensions of the test jet.

The above detailed description of the preferred embodiments, examples, and the appended figures are for illustrative purposes only and are not intended to limit the scope and spirit of the invention, and its equivalents, as defined by the appended claims. One skilled in the art will recognize that many variations can be made to the invention disclosed in this specification without departing from the scope and spirit of the invention.

LIST OF DESIGNATIONS 10 piston cooling nozzle
11 piston
12 cylinder
13 cylinder bore
14 engine block
15 cooling duct
16 combustion chamber recess
17 top side
18 supply duct
19 bottom side
20 coolant feeder
21 tube section
22 cooling nozzle end
23 cylinder center axis
24 surface pressure sensor
25 top side
26 injection nozzle
27 spark plug
28 cylinder head
29 bottom side
30 surface pressure sensor
31 combustion chamber

What is claimed is:

1. A method for checking nozzles of internal-combustion engines, with the nozzles being installed and checked for their correct installation and/or operation prior to the complete assembly of the respective internal-combustion engine, wherein each nozzle is checked with a jet of fluid medium directed toward at least one pressure sensor, wherein the fluid medium is compressed air.

2. The method according to claim 1, wherein compressed air is applied to the injection nozzles (26) for the checking operation, and that the at least one pressure sensor determines at least the position of the compressed air jet emitted by the injection nozzles (26).

3. The method according to claim 2, wherein during the check a continuous, uninterrupted jet of compressed air is generated by the injection nozzles (26).

4. The method according to claim 1, wherein the pressure of the fluid medium is determined in a defined surface region.

5. The method according to claim 4, wherein at least one pressure sensor is employed in determining the pressure of the fluid medium in a defined surface region.

6. The method according to claim 4, wherein a pressure sensor configured as a surface pressure sensor (24, 30) determines the pressure across the surface region.

7. The method according to claim 6, characterized in that an opening of the combustion chamber (31) in a cylinder head (28) is covered by the surface pressure sensor (24, 30).

8. The method according to claim 6, characterized in that a cylinder bore (13) in an engine block (14) is covered by the surface pressure sensor (24, 30).

9. The method according to claim 4, wherein an array comprising a plurality of individual pressure sensors determines the pressure across the surface region, with the pressure sensors together forming a surface pressure sensor (24, 30).

10. The method according to claim 9, characterized in that an opening of the combustion chamber (31) in a cylinder head (28) is covered by the surface pressure sensor (24, 30).

11. The method according to claim 9, characterized in that a cylinder bore (13) in an engine block (14) is covered by the surface pressure sensor (24, 30).

12. A method for checking nozzles of internal-combustion engines, with the nozzles being installed and checked for their correct installation and/or operation prior to the complete assembly of the respective internal-combustion engine, wherein each nozzle is checked with a jet of fluid medium directed toward at least one pressure sensor; and, for the checking of piston cooling nozzles (10), at least one pressure sensor is detachably affixed above a respective cylinder bore (13) on a side of the engine block (14) facing a cylinder head (28).

13. The method according to claim 12, wherein the pressure of the fluid medium across a surface region of the cylinder bore (13) in the engine block (14) is determined by at least one pressure sensor.

14. The method according to claim 12, wherein, for the checking of the piston cooling nozzles (10), the respective cylinder bore (13) in the engine block (14) is covered.

15. The method according to claim 12, wherein compressed air is applied to the piston cooling nozzles (10) for the checking operation, and that the at least one pressure sensor determines at least the position of the compressed air jet emitted by the piston cooling nozzles (10).

16. The method according to claim 12, wherein during the check a continuous, uninterrupted jet of compressed air is generated by the piston cooling nozzles (10).

17. The method according to claim 12, wherein compressed air at approximately room temperature is employed for checking the piston cooling nozzles (10).

18. The method according to claim 12, wherein air compressed at a pressure of 1 to 5 bar is employed for checking the piston cooling nozzles (10).

19. A method for checking nozzles of internal-combustion engines, with the nozzles being installed and checked for their correct installation and/or operation prior to the complete assembly of the respective internal-combustion engine, wherein each nozzle is checked with a jet of fluid medium directed toward at least one pressure sensor and, for the checking of injection nozzles (26), the at least one pressure sensor is detachably arranged on a bearing side of a cylinder head (28) on an engine block (14) in front of a respective combustion chamber (31) at the cylinder head (28).

20. The method according to claim 19, wherein, for checking injection nozzles (26), an opening of the combustion chamber (31) of the cylinder head (28) is covered.

21. The method according to claim 19, wherein air compressed at a pressure of 1 to 5 bar is employed for checking the injection nozzles (26).

22. The method according to claim 19, wherein the at least one pressure sensor determines the pressure of the fluid medium across a surface region of the combustion chamber (31) of the cylinder head (28).

23. The method according to claim 22, wherein compressed air at approximately room temperature is employed for checking the injection nozzles (26).

\* \* \* \* \*